April 4, 1950     H. H. NEEDHAM     2,502,877
WELDED PENSTOCK
Filed Aug. 14, 1944     2 Sheets—Sheet 1
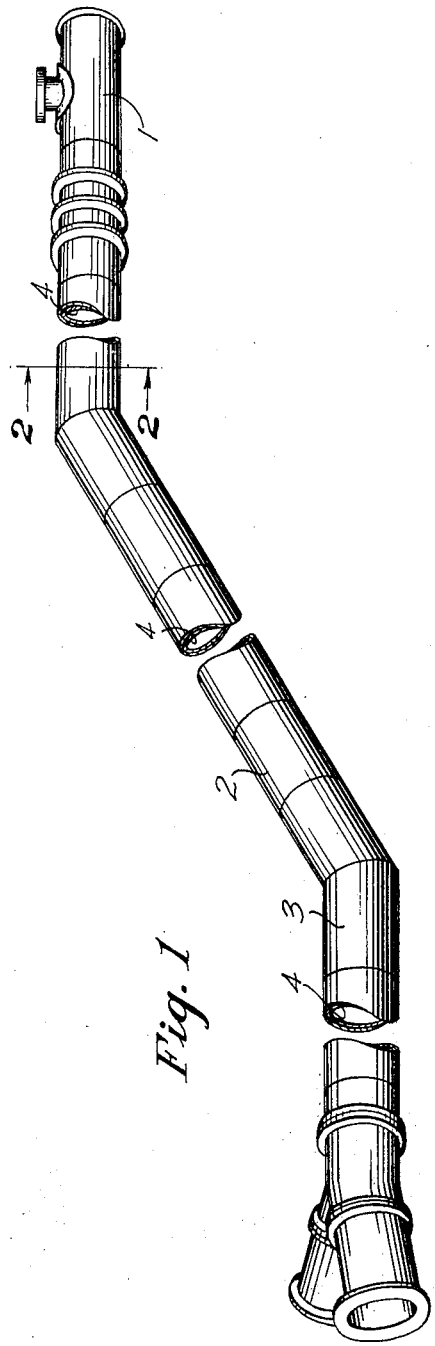
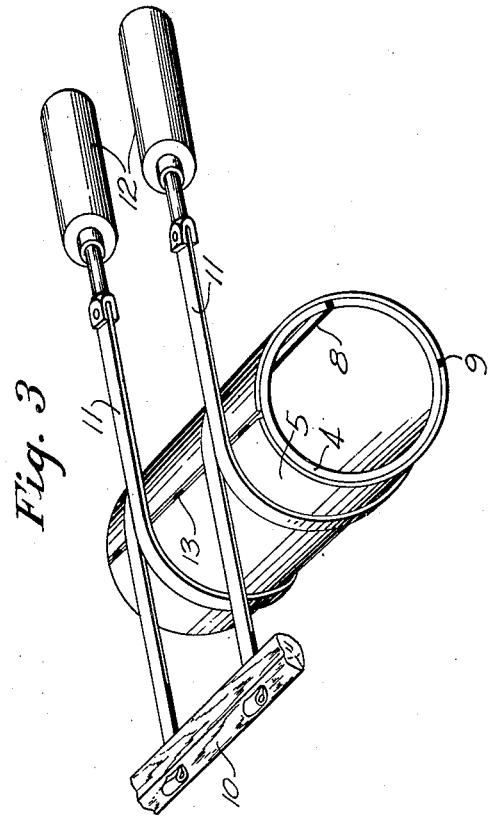
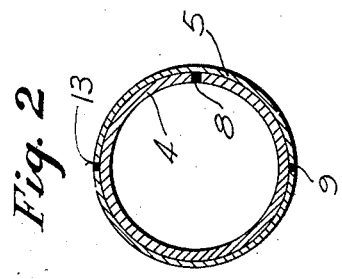
INVENTOR.
HOWARD H. NEEDHAM
BY
ATTORNEY

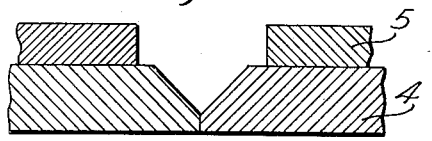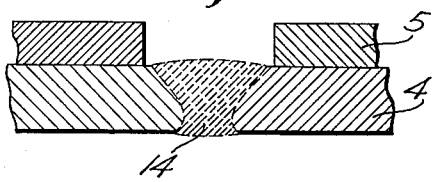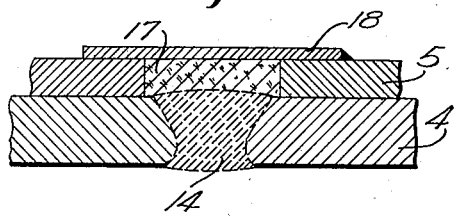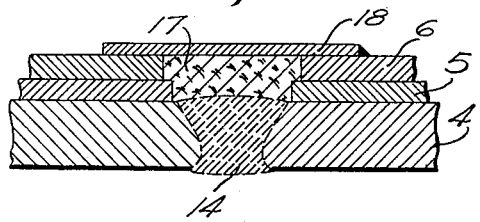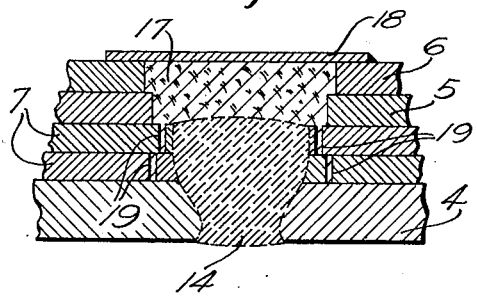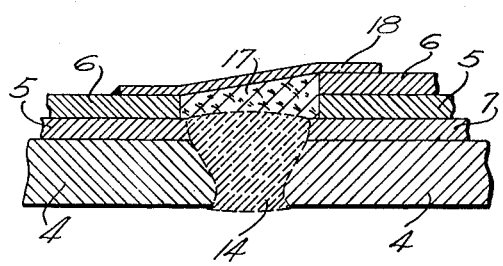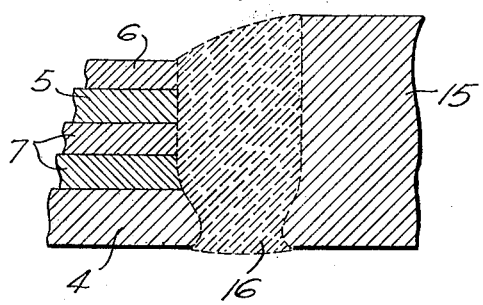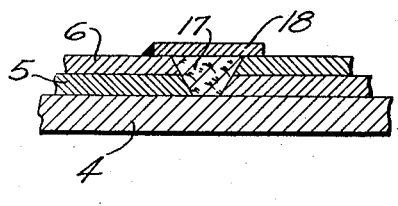

Patented Apr. 4, 1950

2,502,877

UNITED STATES PATENT OFFICE 2,502,877

WELDED PENSTOCK

Howard H. Needham, Wauwatosa, Wis., assignor to A. O. Smith Corporation, Milwaukee, Wis., a corporation of New York Application August 14, 1944, Serial No. 549,474

7 Claims. (Cl. 285—111)

This invention relates to welded penstock employed principally for hydro-electric plants involving high head pressures.

One of the objects of the invention is to provide penstock of greater strength and lighter weight by a proper use of multi-layer construction.

Another object of the invention is to enable the employment of higher strength steel in the construction of thick penstock.

Another object is to provide a circumferential welded joint for multi-layer penstock that is readily fabricated in the field.

Another object is to provide for the protection of the joints and of the exposed ends of the outer layers against corrosion and the like.

Another object is to provide for the ready inspection of such protected joints as may be desired during the life of the penstock.

Other objects and advantages will appear hereinafter in connection with the description of an embodiment of the invention illustrated in the accompanying drawings.

In the drawings:

Figure 1 is a perspective view of a penstock broken in its length;

Fig. 2 is a transverse section taken on line 2—2 of Fig. 1;

Fig. 3 is a perspective view showing how one of the outer layers is applied to the inner layer during fabrication of the penstock section;

Fig. 4 is a detail longitudinal section taken across a girth seam prior to welding;

Fig. 5 is similar to Fig. 4 showing the completed weld;

Fig. 6 is similar to Fig. 5 showing the final application of the protecting structure to the joint;

Fig. 7 is similar to Fig. 6 showing a joint further down on the penstock;

Fig. 8 is similar to Fig. 6 showing a girth joint near the lower end of the penstock;

Fig. 9 is a similar section showing a joint between sections of different wall thickness;

Fig. 10 is a similar section showing a weld between a solid section and a multi-layer section; and Fig. 11 is a detail section of an intermediate covering.

The penstock of the present invention may have various length and may comprise circular pipe of various diameter. It is made up of sections usually about ten feet in length and having a typical diameter of six and a half feet.

The upper end portion 1 of the penstock, having to withstand the lowest head pressure, is constructed of single wall thickness similar to solid wall penstock. The thickness of the uppermost sections will be about one half inch and that of the adjacent sections may be slightly increased, as for instance nine-sixteenths of an inch.

The total thickness of the various sections will increase towards the lower end of the penstock as indicated by the following table:

*Tabulation of plate thicknesses*

| Total Pipe Thickness | Thickness of Plates Used | | |
|---|---|---|---|
| | Inner Shell with Girth Seams Welded | Outer Shell with Girth Seams | |
| | | Welded | Unwelded |
| ½″ | 1 plate ½″ | | |
| ⅝″ | 1 plate ⅝″ | | |
| ¾″ | 1 plate ½″ | | 1 plate ¼″ |
| ⅞″ | 1 plate ⅝″ | | 1 plate ¼″ |
| 1″ | 1 plate ⅝″ | | 1 plate ⅜″ |
| 1⅛″ | 1 plate ⅝″ | 1 plate ¼″ | 1 plate ¼″ |
| 1¼″ | 1 plate ⅝″ | 1 plate ¼″ | 1 plate ⅜″ |
| 1⅜″ | 1 plate 9/16″ | 1 plate ¼″ | 2 plate ¼ and 5/16″ |
| 1½″ | 1 plate 9/16″ | 1 plate ¼″ | 2 plate ⅜ and 9/16″ |

The body portion 2 of the penstock which varies from about one half of an inch in thickness to about one and a half inches is constructed of multi-layer wall in which the inner layer is of a thickness ordinarily not exceeding about nine-sixteenths of an inch and the outer layers vary from one-quarter to about three-eighths of an inch in thickness.

The lower end portion 3 of the penstock may have suitable Y pipe sections which are preferably of single plate solid wall construction.

The various manways, stool pipes, expansion joints, dutchman, thrust rings, and saddles may remain generally similar to former construction.

The present invention is concerned primarily with the body of the penstock which, instead of being constructed of single plate solid wall as heretofore, is constructed of multi-layers.

In the illustration of the invention shown in the drawing, the body portion is made up of sections of different wall thickness, and for convenience of explanation sections 1 at the upper end will be considered to include that portion of the penstock varying from one half inch to three-quarters of an inch on the table, while sections 2 include the portion varying from three-quarters to one and one-eighth inch in thickness, and sections 3 include the remaining portion varying from one and one-quarter to one and a half inches in total thickness.

Each section 1 is composed of an inner layer 4 and an outer layer 5. Each section 2 is composed of an inner layer 4 and two outer layers, 5 and 6, respectively. Each section 3 is composed of an inner layer 4, an intermediate layer 7 and the two outer layers 5 and 6.

The fabrication of sections 1, 2 and 3 in the factory is much the same, and that of section 1 shown in Figs. 3 and 4 will serve to illustrate the same.

In fabricating a section 1, the inner layer 4 is first rolled from a flat plate and welded along a single longitudinal butt seam 8. Then the layer 5 is formed from two semi-cylindrical halves and applied to the structure to be in uniformly close fitting contact therewith. In applying the two halves of layer 5 the opposed edges of one seam 9 are first spaced by suitable spacer blocks and tack welded in place. Then the hydraulic tensioning clamp 10 is made to have its flexible bands or cables 11 encircle the structure with the tangential portions at the ends of the bands near the remaining open seam. Tightening of the bands 11 by the hydraulic cylinders 12 effects tightening of the two halves of layer 5 against the inner layer 4 and in a direction toward the open seam. After tightening of bands 11 the seam 13 is tack welded.

The clamp 10 is then removed and seams 9 and 13 are welded from end to end to complete layer 5 and to weld it to layer 4. In the construction of sections 2 and 3 layers 6 and 7 are similarly applied, each layer being separately and successively applied in pressure contact with the layer beneath.

In constructing the sections 1, 2 and 3 it is possible to utilize higher quality steel for the inner layer 4 than for the remaining layers. When this is done a saving in weight is obtained and the structure will ordinarily be of less cost than a structure made of single plate wall either of the same higher quality steel or of the lower quality steel of the outer layers and respectively of the requisite wall thickness to provide the necessary strength.

The respective ends of the sections 1, 2 and 3 are scarfed differently for the girth seams as illustrated in Figs. 4 to 10, inclusive.

In Figs. 4 to 6, a girth joint is illustrated between two adjacent sections 1. The end edges of the inner layer 4 are scarfed as shown while the end edges of layer 5 are spaced back from the scarf. This is done in order to provide for circumferentially welding only the layers 4 end to end, leaving the layers 5 unwelded and spaced from one another at the girth joint. The resulting weld 14 is illustrated in Fig. 5, in which the ends of layers 5 are spaced apart and from the weld.

This construction eliminates unnecessary welding since the weld 14 between layers 4 is adequate to withstand the relatively low longitudinal stress in the penstock in the region of sections 1 and 2. With former single plate welding the seams had to be secured for the full thickness largely due to the character of the welding operations and this saving could not be made.

The welded girth seam 14 of sections 2 is the same as that for sections 1, both layers 5 and 6 being spaced at the joint and unwelded, as shown in Fig. 7.

The girth seam of section 3, shown in Fig. 8 has the weld 14 which joins the inner layers 4 and also the intermediate layers 7, the end edges of the outer layers 5 and 6 being spaced apart and unwelded.

Fig. 9 illustrates the girth joint between two sections 2 of different thickness in which layers 4 of the two sections are welded together and layer 5 of one section 2 is welded to layer 7 of the other section.

Fig. 10 illustrates the girth joint between a section 3 and an end ring or solid plate section 15. In this instance it is preferable to have the weld 16 extend for the full wall thickness of the sections so that layers 4, 5, 6 and 7 of section 3 are welded to the end edge of part 15.

After the penstock is assembled and welded as shown, each joint is covered by filling the space between the open ends of layers 5 and 6 with a water repellent bitumastic material or other suitable protective composition 17. A relatively thin sheet iron cover 18 is then wrapped around the joint and secured tightly against the outer surfaces of layer 5 or layer 6, as the case may be. The ends of the cover strip 18 are welded together and the strip is welded circumferentially at one edge to the penstock layer beneath. The other edge of strip 18 is preferably left unwelded and free to move relative to the penstock beneath to avoid any danger of buckling of the strip from possible slight expansion and contraction of the outer layers of the penstock.

The covering of the joints in the manner described prevents exposure of the ends of the layers which would result in seepage of water and moisture therebetween and cause rust and corrosion of the metal. The strip 18 prevents possible displacement or rupture of the cover material 17.

For the joints wherein more than one layer is welded, as in the case of joints between sections 3, illustrated in Fig. 8, it is preferable to provide a number of small holes 19 through layers 7 near the weld 14 and in communication between the outer space filled with material 17 and the crevice between layers 4 and 7. The holes 19 may be filled with the material 17 and serve as a means of detection for any possible rupture of the layer 4.

The joints may be periodically inspected by removing the covering and then applying new covering thereto.

The present invention, aside from the method of fabricating the sections, has no relation to former practices relative to high pressure vessels wherein the low ratio between the wall thickness and diameter permitted certain advantages from multi-layer construction. In the present application of multi-layer construction the ratio is so high as to prevent any such advantages.

The multi-layer construction of the present invention enables the girth joints to be constructed in the field with much less welding and less cost. It also makes possible the utilizing of special high strength steel for the inner welded layers and relatively low or medium strength steel for the outer layers. Where the penstock is constructed of a single plate wall of low strength steel for the full thickness, the over-all thickness has to be greater and the cost of such thick plates is considerably greater than the combined cost of the thinner plates described. Likewise, where the penstock is constructed of a single plate wall of high strength steel for the full required thickness, the difficulty of producing pates of such thickness and of uniform quality is so great as to make it too costly.

The present invention by employing a multi-layer structure enables the utilizing of high strength steel throughout or of a composite structure in which the inner and intermediate layers are of high strength and the outer layers are of lower strength.

In practice the inner layers 4 and intermediate layers 7 may be constructed of a steel having from .20 to .30% carbon and .75 to 1.25% manganese, and having an ultimate tensile strength of 75,000 pounds per square inch and a minimum yield point of about 45,000 pounds per square inch. The outer layers 5 and 6 preferably are constructed of the same steel, although they may be constructed of a lower strength steel having a tensile strength of around 60,000 pounds per square inch and a yield point of about 35,000 pounds per square inch.

High strength low alloy steels may be employed in the construction where large plates of the thickness indicated can be produced with sufficient uniformity in composition and quality.

The outer layers 5 and 6 may be constructed of lengths divisible in the length of the sections as illustrated in Fig. 11 wherein the layers 5 and 6 have a little less than half the length of layer 4. Spaces are left between the opposed end edges of layers 5 and 6 intermediate the ends of the section and these spaces should be filled with material 17 and covered by strips 18 as described for the welded joints.

Various embodiments of the invention may be employed within the scope of the accompanying claims.

I claim:

1. In a penstock, a cylindrical wall made up of a plurality of layers of metal in uniform tight engagement with one another, the inner portion of the wall having circumferential butt welds between adjacent sections thereof, and the outer portion of the wall having its edges receding longitudinally of the penstock from the corresponding weld, the inner portion of each weld being designed to withstand the collapse stress and longitudinal stress in service, and the outer portion combining with the inner portion throughout substantially the entire length of the structure to withstand the circumferential stress in service.

2. In a penstock, a cylindrical wall made up of a plurality of layers of metal in uniform tight engagement with one another, the inner portion of the wall having circumferential butt welds between adjacent sections thereof, and the outer portion of the wall having its edges receding longitudinally of the penstock from the corresponding weld and the space therebetween filled with a water repellant protective material, the inner portion of each weld being designed to withstand the collapse stress and longitudinal stress in service, and the outer portion combining with the inner portion throughout substantially the entire length of the structure to withstand the circumferential stress in service.

3. In a structure of the class described, a cylindrical wall made up of a plurality of layers of metal in uniform tight engagement with one another, the inner portion of the wall having circumferential butt welds between adjacent sections thereof, and the outer portion of the wall having its edges receding from the weld and the space therebetween filled with a water repellant protective material, and a thin cover band encircling the joint and secured to the structure to retain said material in place.

4. In a structure of the class described, a cylindrical wall made up of a plurality of layers of metal in uniform tight engagement with one another, the inner portion of the wall having circumferential butt welds between adjacent sections thereof, and the outer portion of the wall having its edges receding from the weld and the space therebetween filled with a water repellant protective material, and a thin metal band covering said material and having one edge welded to the outer wall of the structure with the other edge free to move relative to the structure.

5. In a structure of the class described, a cylindrical wall made up of a plurality of layers of metal in uniform tight engagement with one another, the inner portion of the wall having circumferential butt welds between adjacent sections thereof, and the outer portion of the wall having its edges receding from the weld and the space therebetween filled with a water repellant protective material, the crevices between the inter-faces of the layers being in communication with the space containing said protective material to facilitate detection of leaks in the structure, and said material preventing seepage of water between said layers.

6. A multi-layer penstock or the like comprising a tubular body made up of sections welded together end to end and in which at least one of the joints consists of deposited weld metal securing only the inner portion of the walls of the aligned sections and leaving the outer portion of said walls spaced across the joint at least a distance equal to the width of the weld and substantially free from stress transfer longitudinally across the joint.

7. A penstock or the like comprising a tubular body made up of sections welded together end to end and in which at least one of the joints consists of deposited weld metal securing only the inner portion of the walls of the aligned sections and leaving the outer portion of said walls spaced across the joint at least a distance equal to the width of the weld and substantially free from stress transfer longitudinally across the joint, the outer portion of the walls of said sections constituting a separate layer of metal from said inner portion.

H. H. NEEDHAM.

REFERENCES CITED

The following references are of record in the file of this patent:

UNITED STATES PATENTS

| Number | Name | Date |
| --- | --- | --- |
| 2,133,059 | Snelling | Oct. 11, 1938 |
| 2,253,093 | Reichle | Aug. 19, 1941 |
| 2,337,247 | Kepler | Dec. 21, 1943 |